Sept. 5, 1950      E. B. HAMMOND, JR      2,520,929

NUTATION DAMPING MEANS FOR GYROSCOPIC INSTRUMENTS

Filed May 16, 1947

INVENTOR.
EDMUND B. HAMMOND, JR.
BY Herbert H. Thompson
his ATTORNEY.

Patented Sept. 5, 1950

2,520,929

UNITED STATES PATENT OFFICE 2,520,929

NUTATION DAMPING MEANS FOR GYROSCOPIC INSTRUMENTS

Edmund B. Hammond, Jr., Albertson, N. Y., assignor to The Sperry Corporation, a corporation of Delaware Application May 16, 1947, Serial No. 748,424

6 Claims. (Cl. 74—5.5)

This invention relates to means for damping nutational oscillations of a gyroscopic element of an instrument of this character. The damping means provided is of the type employing an inertia member with an oscillation amplitude that is substantially less than the amplitude that the gyroscopic element has at nutation. During an interval of nutation, the gyroscopic element of the instrument oscillates about an axis and the inertia member oscillates at a slower rate so that a damping torque is applied about the axis to restore the instrument to a normal condition.

One of the features of the present invention resides in provision of an inertia member or weight that is pivotally mounted and balanced about the axis of the instrument that nutational oscillation can occur.

Another feature of the invention is provided by resilient means between the gyroscopic element and inertia member that urges the member to frictionally engage the element.

Still a further feature of the invention pertains to the provided slip friction spring connection between the gyroscopic element and the inertia member.

Other features and structural details of the invention will be more apparent from the following description taken in connection with the accompanying drawing in which the preferred form of the invention is shown.

Figure 1:
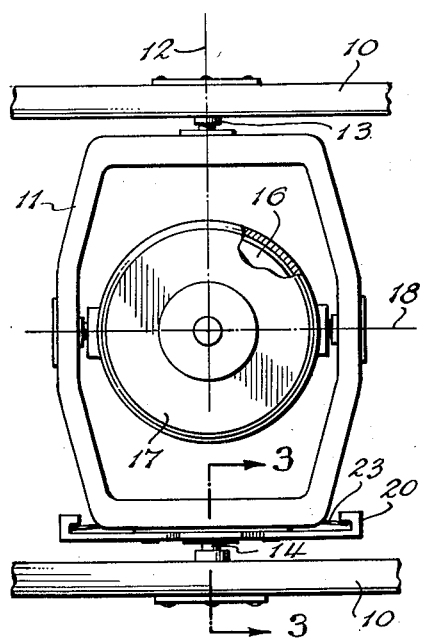
Fig. 1 is a side elevation view of a gyroscopic instrument with the improved damping means incorporated therein.
Figure 2:
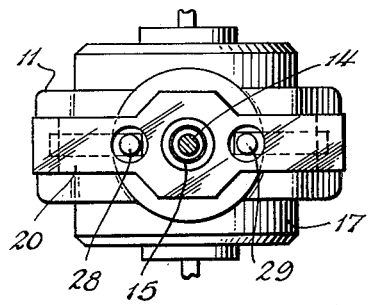
Fig. 2 is a bottom plan view of the instrument shown in Fig. 1 with the casing removed.

With reference to the drawing, a gyroscopic instrument of the rate gyro type, for example, is employed in connection with the description of the invention. This type of gyroscopic instrument may be incorporated for use in a gun sight as particularly shown and described in my copending application Serial No. 748,815, filed May 17, 1947 for computing gun sights. As herein shown, the gyroscopic instrument includes a casing 10 in which a vertical or gimbal ring 11 is pivotally mounted about a vertical axis 12, in this instance. The pivotal connection between the casing 10 and ring 11 is provided herein by top and bottom stub shafts 13 and 14 fixed to casing 10 and ball bearings 15, Fig. 2, in the ring 11 which are only shown herein in connection with the stub shaft 14. The gyro rotor 16 of the instrument is suitably spun in a rotor frame or case 17 about a horizontal axis that is normal to the plane of the paper as viewed in Fig. 1 of the drawing. The frame 17 is pivotally mounted on the ring 11 for movement about a horizontal axis 18. The pivotal connection between these parts may be made by bearing and stub shaft arrangements of the character hereinbefore described.

Figure 3:
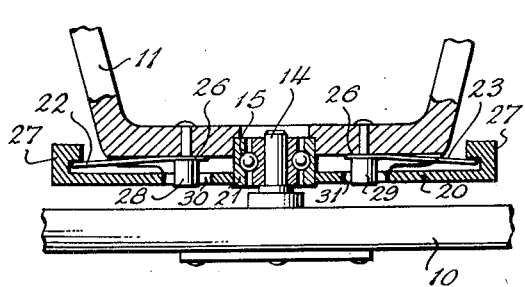
Fig. 3 is an enlarged sectional view taken on lines 3—3, Fig. 1.

For the purposes of the present description, the instrument may be considered to have a gyroscopic element, such as gimbal ring 11, having an axis 12 about which nutational oscillations can occur. In accordance with the present inventive concepts in order to damp such oscillations of the gyroscopic element, I provide an inertia member indicated at 20 whose amplitude of oscillation is substantially less than the nutational oscillation amplitude of the ring and frame about axis 12 when it occurs. Member 20 is a weight that is balanced about axis 12 and is pivotally mounted about axis 12 on the outer bearing race 21 for the ball bearings 15. Race 21, as shown in Fig. 3, is fixedly connected to the gimbal ring 11. By this arrangement it will be understood that there is no movement of member 20 radially of the oscillation axis of the instrument.

Figure 4:
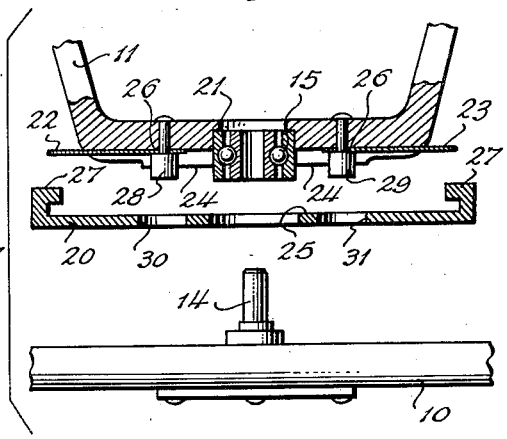
Fig. 4 is an exploded schematic view showing the parts of the damping means in spaced relation.

The damper further includes resilient means in the form of two cantilever springs 22, 23 between the element or ring 11 and the inertia member. The unflexed position of springs 22 and 23 is shown in Fig. 4. With the dampening means assembled the springs are flexed to urge the inertia member to frictionally engage the element or ring 11. This engagement is between the bottom surface 24 of the ring and the upper or mating surface 25 of the inertia member. Springs 22 and 23, also make a slip friction connection with inertia member 20. One end of the cantilever type springs 22, 23 is fixed to the gimbal ring 11 or gyroscopic element as indicated at 26. The pair of springs 22, 23 have respective oppositely disposed free portions that extend radially of the axis of oscillation 12. The ends of the springs 22, 23 frictionally engage the member 20 in two oppositely disposed portions thereof that are peripherally flanged as indicated at 27. As shown in Fig. 3, the resilient means or springs engage the inner surfaces of the flanged portions 27 of the balanced inertia member 20.

To prevent disengagement of the springs 22, 23 and member 20 with oscillation about axis 12, means are provided to limit the relative angular movement between the same. Such means, as herein shown, may take the form of one or more pin and slot connections. Two of the same are herein illustrated, the pins being indicated at 28, 29 which are fixed to ring 11 and the slots being indicated at 30, 31. As shown, the slots 30, 31 are in the inertia member and are circular in form.

Upon nutational oscillation of the apparatus about axis 12 due to any reason, it will be understood that the inertia member due to its frictional engagement with both the ring and springs also oscillates about axis 12 at a lower amplitude than the gyroscopic element oscillates. As the oscillations of the inertia member lag that of the gyroscopic element, a torque is exerted by the member through its frictional engagement with the ring about axis 12 that opposes or damps the oscillations of the element until the same cease.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. Nutation damping means for gyroscopic instruments comprising the combination of, a gyroscopic element having a frictional surface about its axis of oscillation, a balanced inertia member pivotally mounted with freedom about the axis of oscillation of the gyroscopic element having a lower amplitude of oscillation than the element and a surface mating with the frictional surface of the element, and resilient means fixedly connected to said element and frictionally engaged with said member for frictionally engaging the cooperating surfaces so that a torque, caused by the lower amplitude oscillations of said inertia member, is effective to damp the nutational oscillations of said element about its axis.

2. Damping means as claimed in claim 1, including means for limiting the relative freedom between the element and member about the axis of oscillation.

3. Nutation damping means for gyroscopic instruments comprising the combination of, a gimbal ring having a frictional surface about its axis of oscillation, a balanced inertia member pivotally mounted with freedom about the axis of oscillation of the gimbal ring having a lower amplitude of oscillation than the ring and a surface mating with the frictional surface of the ring, and resilient means fixedly connected to said ring and frictionally engaged with said member for frictionally engaging the cooperating surfaces so that a torque, caused by the lower amplitude oscillations of said inertia member, is effective to damp the nutational oscillations of said ring about its axis.

4. The combination claimed in claim 3, including means for limiting the relative freedom between the ring and member about the axis of oscillation comprising a pin and slot connection.

5. In a gyroscopic instrument, the combination of, a gyroscopic element having a frictional surface about its axis of oscillation, and a balanced inertia member pivotally mounted with freedom about the axis of oscillation of the element having a lower amplitude of oscillation than the element and a surface frictionally engaged with the frictional surface of the element, the oscillations of said member, during nutational oscillations of said element, causing the exertion of a damping torque on the element through the frictionally engaged surfaces.

6. In a gyroscopic instrument, the combination of, a gimbal ring having a frictional surface about its axis of oscillation, and a balanced inertia member pivotally mounted with freedom about the axis of oscillation of the ring having a lower amplitude of oscillation than the ring and a surface frictionally engaged with the frictional surface of the ring, the oscillations of said member, during nutational oscillations of said ring, causing the exertion of a damping torque on the ring through the frictionally engaged surfaces.

EDMUND B. HAMMOND, JR.

REFERENCES CITED

The following references are of record in the file of this patent:

UNITED STATES PATENTS

| Number | Name | Date |
|---|---|---|
| 2,411,550 | Lynn et al. | Nov. 26, 1946 |
| 2,412,453 | Grimshaw | Dec. 10, 1946 |

FOREIGN PATENTS

| Number | Country | Date |
|---|---|---|
| 3318 of 1915 | Great Britain | Mar. 6, 1919 |